United States Patent
Kim et al.

(10) Patent No.: US 7,810,113 B2
(45) Date of Patent: Oct. 5, 2010

(54) SECURITY DEVICE AND HEAD END IN CONDITIONAL ACCESS SYSTEM AND METHOD FOR CONTROLLING ILLEGAL USE IN THE SYSTEM

(75) Inventors: Dae-youb Kim, Seoul (KR); Hwan-joon Kim, Seoul (KR); Maeng-hee Sung, Seoul (KR); Weon-il Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1007 days.

(21) Appl. No.: 11/401,385

(22) Filed: Apr. 11, 2006

(65) Prior Publication Data

US 2006/0271950 A1 Nov. 30, 2006

(30) Foreign Application Priority Data

May 27, 2005 (KR) .................. 10-2005-0045086

(51) Int. Cl.
*H04L 9/00* (2006.01)
(52) U.S. Cl. .................... 725/31; 380/210; 725/143
(58) Field of Classification Search ............ 725/31, 725/143–153; 380/210, 280–287
See application file for complete search history.

(56) References Cited

U.S. PATENT DOCUMENTS

| | | | |
|---|---|---|---|
| 4,712,238 A * | 12/1987 | Gilhousen et al. | 380/232 |
| 2004/0120529 A1* | 6/2004 | Zhang et al. | 380/278 |
| 2004/0123313 A1* | 6/2004 | Koo et al. | 725/31 |
| 2004/0181800 A1* | 9/2004 | Rakib et al. | 725/25 |
| 2006/0098822 A1* | 5/2006 | Markey | 380/210 |
| 2009/0106850 A1* | 4/2009 | Robert et al. | 726/30 |
| 2009/0150673 A1* | 6/2009 | DeFreese et al. | 713/170 |

OTHER PUBLICATIONS

Morris et al. "Interactive TV Standards", May 5, 2005, Focal Press, 4 pages.*
Dodis et al. "A Generic Construction for Intrustion Resilient Public Key Encryption", 2004, pp. 81-98.*

* cited by examiner

*Primary Examiner*—Nasser Moazzami
*Assistant Examiner*—Lisa Lewis
(74) *Attorney, Agent, or Firm*—NSIP Law

(57) ABSTRACT

A security device and a head end of a conditional access system (CAS), and a method for controlling illegal use of the conditional access system, capable of minimizing the number of entitlement management messages (EMMs) to be distributed from a head end to a user are provided. Update keys encrypted with user keys and channel management keys encrypted with the update keys are utilized.

14 Claims, 13 Drawing Sheets

FIG. 14

- ENVIRONMENT :
  * SUBSCRIBERS (TEN MILLION SUBSCRIBERS), SERVICE CHANNELS (100 CHANNELS)
  * KEY CHANGE PERIOD: CW(10SEC), CEK=MK(24 HOURS), BK (30DAYS)
  * COMPROMISED SMART CARD ("CSC"): TEN CARDS
  * KEY DISTRIBUTION SCHEME DISCLOSED IN US 2004/0120529("IBM") VS PRESENT INVENTION

| | CLASS | | NUMBER OF EMM PACKETS TRANSMISSION AMOUNT | NOTE |
|---|---|---|---|---|
| PRESENT INVENTION | FOR CEK | | 100 | NUMBER OF ALL VIEWERS: N<br>AVERAGE NUMBER OF VIEWERS PER CHANNEL: n<br>NUMBER OF CSC: r<br>NUMBER OF CHANNELS: m<br>PRESENT INVENTION<br>= $[2 \times \{(N-n)-r\}-1]+m$<br>IBM = $[2 \times \{(N-n)-r\}-1] \times m$ |
| | FOR BK | WHEN THERE IS NO CS CARD | 1(NO CSC) :101 PACKETS | |
| | | WHEN THERE IS CS CARD | 19(WITH CSC) :119 PACKETS | |
| IBM | FOR CEK | | (2*1000000−1)*100(NO CSC) 199,999,900 | 90% VIEWING RATE PER CHANNEL |
| | | | (2*100000−1)*100(NO CSC) 19,999,900 | 99% VIEWING RATE PER CHANNEL |
| | FOR MK | | 100(NO CSC) 100 | 100% VIEWING RATE PER CHANNEL |
| | | | 19*100(WITH CSC) 1,900 | 100% VIEWING RATE PER CHANNEL COMPROMISED SMART CARD GENERATED |

SECURITY DEVICE AND HEAD END IN CONDITIONAL ACCESS SYSTEM AND METHOD FOR CONTROLLING ILLEGAL USE IN THE SYSTEM

CROSS-REFERENCE TO RELATED APPLICATIONS

This application claims benefit under 35 U.S.C. §119 from Korean Patent Application No. 2005-45086, filed on May 27, 2005, the entire disclosure of which is hereby incorporated by reference.

BACKGROUND OF THE INVENTION

1. Field of the Invention

The present invention relates to a security device and a head end of a conditional access system (CAS), and a method for controlling illegal use in a conditional access system. More particularly, the present invention relates to a security device and a head end of a conditional access system (CAS), and a method for controlling illegal use of a content protected by a conditional access system, capable of controlling a security device illegally copied at the head end and minimizing the number of entitlement management messages to be distributed to a user.

2. Description of the Related Art

A conditional access system (hereinafter, referred to as "CAS") has been well known and widely used in connection with a paid broadcasting system available currently. A conventional conditional access system is described in U.S. Pat. Nos. 4,631,901 and 4,712,238, the disclosures of which are hereby incorporated by reference in their entireties. Such a conditional access system broadcasts a program to a subscriber, the program being scrambled with a control word and received by a subscriber holding a security device, such as a smart card, and a set top box. Other data, which are transmitted together with the scrambled program, includes an entitlement management message (EMM) and an entitlement control message (ECM), which are needed when the security device descrambles the broadcasted program. Typical forms of the ECM and EMM messages are defined in the International standard ISO IEC 13818-1, the disclosure of which is hereby incorporated by reference in its entirety.

FIG. 1 illustrates an operation principle of a conventional CAS. Referring to FIG. 1, a conventional CAS encodes a to-be-broadcasted content containing for example video, audio, and data using an encoder (not shown) in a suitable coding system (for example, MPEG-II in digital broadcasting), and encrypts or scrambles the encoded broadcasting stream using a scrambler S 103 under the control of a control word CW generated by a control word generator CW_G. The control word CW is encrypted E(CW) with an access condition for legally using provided service at a head end 100 by an encryptor E 101b under the control of a media key MK. Another encryptor E 101a encrypts the media key MK using a unique user key UK only assigned to a subscriber. A decryptor D 109a at the subscriber side decrypts the received encrypted media key E (MK) with the user key UK, and another decryptor D 109b decrypts the received encrypted control word E (CW) with the decrypted media key MK. The descrambler DS 111 descrambles the scrambled code stream with the decrypted control word.

In such a conventional CAS, as the number of subscribers 150 increases, the number of unique user keys UKs distributed (assigned) to the subscribers increases. As a result, the media key MK, which is encrypted using a user key UK as an encryption key, is a kind of the EMM message, and the number of the media keys increases in proportion to the number of users. For example, if there are million subscribers, the CAS should broadcast media keys MK encrypted with respective user keys UK of the million subscribers to update the media key MK. Further, if one of the million subscribers withdraws subscription, the CAS should broadcast an updated control word that is encrypted with user keys of remaining 999,999 subscribers. Thus, in the conventional CAS, as the number of the subscribers increases, the number of EMM messages distributed by the head end 100 increases, laying a heavy burden on the head end 100. The user (particularly, conditional access module) should filter one of a number of EMM messages that is encrypted with his or her user key, thereby laying a burden on the user.

In order to mitigate the burden on the head end 100 and the user and exclude illegal users, a scheme for distributing minimal user keys is described in U.S. Patent Laid-open Publication 2004/0120529, entitled "Key distribution in a conditional access system," Jun. 24, 2004, the disclosure of which is hereby incorporated by reference in its entirety.

A key distribution method described in the above-stated U.S. Publication No. 2004/0120529 (hereinafter, referred to as "IBM" technique) will be described.

It is first assumed that a set consisting of subscribers and illegal users of a conditional access system is a universal set U, and a set having subscribers (legal users) as elements, that is, a subset of the universal set U is S. The legal users may be selected from the universal set U. As a technique for the selection, there is a method called a traitor tracing scheme. The traitor tracing scheme is described, for example, in U.S. Laid-open Publication No. 2004/0111611, entitled "Method for tracing traitors and preventing piracy of digital content in a broadcast encryption system," the disclosure of which is hereby incorporated by reference in its entirety Now, a set S that is a collection of selected legal users is decomposed into at least one subset. These subsets are assigned a subset user key (SUK). Respective subset user keys (SUKs) assigned to subsets to which users belong are distributed to the users.

A case where an illegally copied smart card is found, with users holding a subset user key (SUK), will be described with reference to FIG. 2.

FIG. 2 illustrates a method for distributing a user key in a CAS. Referring to FIG. 2, users V3 and V2 indicated by dotted lines are illegal users. Subsets consisting of only legal users excluding the illegal users include for example D(U1, v1), D(U2, v2), and D(U3, v3). D(U1, v1) indicates a subset including all users connected to a node U1 and excluding users connected to a node V1. Meanwhile, each of users U7 to U10 belonging to D(U1, v1) has the same subset user key. Similarly, D(U2, v2) is a subset including all users connected to a node U2 and excluding users connected to v2. Similarly, a user U6 belonging to D (U2, v2) has a subset user key. Further, D(U3, v3) is a subset indicating a user U5. A user U5 belonging to D (U3, v3) has a subset user key.

As such, the use of the subset user key (SUK) allows illegally copying persons and service subscription withdrawing persons to be excluded using a minimal number of EMM messages when a security device is illegally copied or service subscription is withdrawn.

However, even though the above-described IBM technique is used, the number of the EMM messages increases by a multiple of the number of service channels if the number of the service channels increases.

Accordingly, there is a need for a CAS system capable of minimizing a burden due to the to-be-transmitted EMM messages, while excluding illegally copying person or withdrawing persons if a security device is illegally copied or service subscription is withdrawn.

SUMMARY OF THE INVENTION

Accordingly, it is an exemplary object of the present invention to provide a conditional access system (CAS) capable of minimizing a burden due to the to-be-transmitted EMM messages.

Another exemplary object of the present invention is to provide a security device and a head end capable of minimizing a burden due to the to-be-transmitted EMM messages if there is an illegal copy.

Yet another exemplary object of the present invention is to provide a method for controlling illegal use of a conditional access system (CAS) while minimizing a burden due to to-be-transmitted EMM messages.

The above exemplary object of the present invention is substantially realized by, for example, providing a security device for a conditional access system (CAS), and the device comprising a key database for storing a unique user key UK assigned to a subscriber. A decryptor is provided for sequentially decrypting an update key $E_{UK}(BK)$ encrypted with the user key UK, a channel management key $E_{BK}(CMK)$ encrypted with the update key BK, and a control word $E_{CMK}(CW)$ encrypted with the channel management key CMK, which are received from a head end of the conditional access system, with the stored user key UK in the key database and outputting a control word CW.

The device may further include an entitlement information database for storing updatable entitlement information on the subscriber, A comparator is provided for comparing an access condition received from the head end to the stored entitlement information, wherein the comparator receives the control word CW from the decryptor and outputs it to a descrambler connected to the comparator, the comparator controlling the output of the control word CW to the descrambler according to a comparison result between the access condition and the entitlement information.

The access condition may indicate a condition for legally using service provided to the subscriber, and the entitlement information indicates information on entitlement of a subscriber requesting the service, and the comparator may output the control word CW to the descrambler only if the entitlement information matches the access condition.

On the assumption that a set consisting of subscribers and illegal users of a conditional access system is a universal set U, and a set having the subscribers as elements that is, a subset of the universal set U is S, when the set S is decomposed into at least one subset and each of the subsets is assigned a subset user key. The stored user key UK in the key database may be one, assigned to the decomposed subsets to which a subscriber having the security device belongs, of the assigned subset user keys SUK.

Further, the encrypted channel management key $E_{BK}$(CMK) may include a channel packing key $E_{BK}$(CPK) encrypted with the update key BK and a channel encryption key $E_{CPK}$(CEK) encrypted with the channel packing key CPK, the encrypted control word CW being encrypted with the channel encryption key CEK.

The stored user key UK in the key database may include a master private key MPK and a broadcast user key BEK, the decryptor may further receive a broadcast user key $E_{MPK}$(BEK) encrypted with the master private key MPK, and the encrypted update key $E_{UK}(BK)$ received by the decryptor may be an update key $E_{BEK}(BK)$ encrypted with the broadcast user key BEK.

The stored user key UK in the key database may include a master private key MPK, a private key PK, and a broadcast user key BEK, the decryptor may further receive a private key PK encrypted with the master private key MPK and a broadcast user key $E_{PK}$(BEK) encrypted with the private key PK, and the encrypted update key $E_{UK}(BK)$ received by the decryptor may be a update key $E_{BEK}(BK)$ encrypted with the broadcast user key BEK.

In accordance with another exemplary aspect of the present invention, there is provided a head end for a conditional access system (CAS), and the head end comprising a key database for storing a unique user key UK assigned to a subscriber of the conditional access system; a generator for generating a update key BK, a channel management key CMK, and a control word CW. An encryptor is provided for encrypting the update key BK with the user key UK, the channel management key CMK with the update key BK, and the control word CW with the channel management key CMK. A transmitter transmits the encrypted update key $E_{UK}$(BK), the encrypted channel management key $E_{BK}$(CMK), and the encrypted control word $E_{CMK}$(CW) to the subscriber.

On the assumption that a set consisting of subscribers and illegal users of a conditional access system is a universal set U, and a set having the subscribers as elements, that is, a subset of the universal set U is S, when the set S is decomposed into at least one subset and each of the subsets is assigned a subset user key, the user key UK may be the assigned subset user key.

The channel management key CMK may include a channel packing key CPK and a channel encryption key CEK, the encryptor, encrypting the channel management key CMK with the update key BK, may encrypt the channel packing key CPK with the update key BK and the channel encryption key CEK with the channel packing key CPK, and the encryptor, encrypting the control word CW with the channel management key CMK, may encrypt the control word CW with the channel encryption key CEK.

The user key UK may include a master private key MPK and a broadcast user key BEK, the encryptor may further encrypt the broadcast user key BEK with the master private key MPK, and the encryptor, encrypting the update key BK with the user key UK, may encrypt the update key BK with the broadcast user key BEK.

The user key UK may comprise a master private key MPK, a private key PK and a broadcast user key BEK, the encryptor further encrypts the private key PK with the master private key MPK and the broadcast user key BEK with the private key PK, and the encryptor, encrypting the update key BK with the user key UK, encrypts the update key BK with the broadcast user key BEK.

In accordance with another exemplary aspect of the present invention, there is, provided a method for controlling illegal use of a conditional access system (CAS), the method comprising distributing an update key BK, a channel management key CMK, and a control word CW to a subscriber of the conditional access system, encrypting an updated update key BKn with a unique user key UK of the subscriber, an updated channel management key CMKn with the updated update key BKn, and an updated control word CWn with the updated channel management key CMKn, and redistributing them to the subscriber, and sequentially decrypting the re-distributed encrypted update key $E_{UK}$(BKn), channel management key $E_{BK}$(CMKn), and control word $E_{CMK}$(CWn) with the user key UK of the subscriber. The distributed update key BK, channel management key CMK, and control word CW are updated with the updated update key BKn, updated channel management key CMKn, and updated control word CWn.

On the assumption that a set consisting of subscribers and illegal users of a conditional access system is a universal set U, and a set having the subscribers as elements, that is, a subset of the universal set U is S, when the set S is decomposed into at least one subset and each of the subsets is assigned a subset user key, the user key UK may be one, assigned to the decomposed subsets to which the subscriber belongs, of the assigned subset user keys SUK.

BRIEF DESCRIPTION OF THE DRAWINGS

The above aspects and features of the present invention will be more apparent by describing certain embodiments of the present invention with reference to the accompanying drawings, in which like reference numerals will be understood to refer to like parts, components and structures, where:

FIG. 14 illustrates a comparison in performance between an exemplary embodiment of the present invention and a conventional system.

DETAILED DESCRIPTION OF EXEMPLARY EMBODIMENTS

Hereinafter, certain exemplary embodiments of the present invention will be described in greater detail with reference to the accompanying drawings.

For convenience of illustration, several kinds of keys used herein are shown in Table 1.

TABLE 1

| Classification | | | Name of Keys | Abbreviation |
|---|---|---|---|---|
| Entitlement management Key (EMK) | Service key Update key | User key (UK) | Master private key | MPK |
| | | | Private key | PK |
| | | | Broadcast user key | BEK |
| | | | Subset user key | SUK |
| | | | Update key | BK |
| | Service key (SK) | Channel management key (CMK) | Channel packing key | CPK |
| | | | Channel Encryption key | CEK |
| | | | Control word | CW |

Referring to Table 1, examples of the user keys (UKs) include a master private key (MPK), a private key (PK), a broadcast user key (BEK), and/or a subset user key (SUK), examples of the channel management keys (CMKs) include a channel packing key (CPK) and a channel encryption key (CEK), examples of the service key update keys include a user key (UK) and a update key (BK), and examples of the entitlement management keys (EMKs) include a service key update key and a service key (SK). Here, the master private key (MPK) and the private key (PK) are optional. That is, the master private key (MPK) and the private key (PK) may be used or not used according to embodiments. Further, the subset user key (SUK) and the channel packing key (CPK) are also optional.

Figure 3:
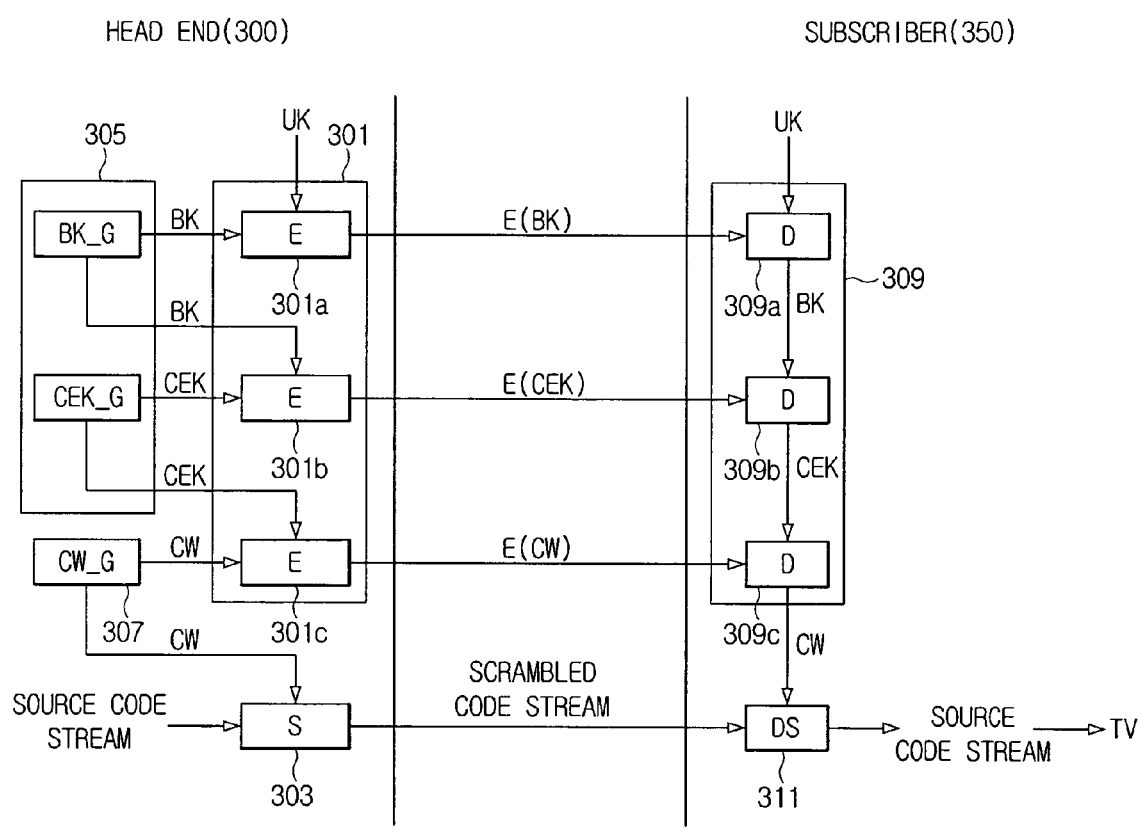
FIG. 3 illustrates an operation principle of a CAS according to an exemplary embodiment of the present invention.

FIG. 3 illustrates an operation principle of a CAS according to an exemplary embodiment of the present invention.

The CAS according to an exemplary implementation of the present invention comprises a head end 300 (a service provider side) including a key encryptor 301, a key generator 305, a control word generator 307 and a scrambler 303; a security device (for example, a smart card) including a decryptor 309; and a descrambler 311. It is to be noted that some elements are not shown in FIG. 3, for clarity and conciseness of description.

The key generator 305 includes an update key (BK) generator BK_G, and a channel encryption key (CEK) generator CEK_G. The key generators may be random number generators, and may generate an update key BKn and a channel encryption key CEKn, which are updated periodically or upon a need.

The control word generator 307 generates a control word corresponding to channel information and delivers the control word together with the channel information to the encryptor 301c and the scrambler 303. The control word may be updated and should be delivered to the subscriber 350 before the control word is used for scrambling, that is, before its lifetime expires.

The update key BK is used to update service keys (SKs) such as a channel encryption key (CEK) and a channel packing key (CPK) periodically or as needed. In an exemplary embodiment of the present invention, the head end 300 may encrypt the updated service key (SKn) such as an updated channel encryption key CEKn or an updated channel packing key CPKn with the updated update key BKn and distribute the encrypted the updated service key to the subscriber.

The update key BK may be updated for example in the following cases: where a smart card is illegally copied and where a lifetime of the update key BK expires.

In the first case, a group consisting of legal users is selected, an update key BK is encrypted with a subset user key SUK corresponding to the group, and the encrypted update key is transmitted to a subscriber. In the second case, an update key BK is encrypted with a user key UK and the encrypted update key BK is sent to the subscriber, or an updated update key BKn is encrypted with an old update key BK as an encryption key and the encrypted updated update key BKn is transmitted to the subscriber.

The user key UK is uniquely assigned to a user and commonly stored when a security device is distributed. In an exemplary embodiment of the present invention, a master private key MPK, a private key PK, and/or a broadcast user key BEK are used as the user key UK. The master private key MPK and the private key PK are used to safely deliver a set of keys (PK, BEK, BK, CEK or CPK) needed for distributing the security device. The broadcast user key BEK may be encrypted using the private key PK or the master private key MPK as an encryption key, and the private key PK may be encrypted using the master private key MPK as a key. The respective encrypted user keys are distributed to the subscriber. The master private key MPK is not updated, and the private key PK may be updated or not updated. Meanwhile, if only the broadcast user key BEK is used, that is, if the master private key MPK and the private key PK are not used, the broadcast user key BEK is not updated. The broadcast user key BEK is used to encrypt the update key BK.

In another exemplary embodiment of the present invention, a user key defined as a subset user key SUK is additionally used. The subset user key SUK is described in U.S. Patent Laid-open Publication No. 2004/0120529, entitled "Key Distribution in a Conditional Access System," by Jian Zhang, Zong Wei Lui, Ling Shao, and Dong Xie, the disclosure of which is hereby incorporated by reference in its entirety.

The encryptor 301a encrypts the update key BK using a user key UK, such as a broadcast user key BEK, as an encryption key. Meanwhile, the encryptor 301b encrypts the channel encryption key CEK using the update key BK as the encryption key, and the encryptor 301c encrypts the control word CW using the channel encryption key CEK as a key. In an exemplary embodiment of the present invention, the encryptor 301c encrypts channel information, an access condition, and a control word with the channel encryption key CEK.

The scrambler 303 may scramble a source code stream using the control word CW as the encryption key. The source code stream may be data that is encoded by a coding method, such as for example Moving Pictures Expert Group II (MPEG-II). The MPEG-II standard is comprised of a system encoding section (ISO/IEC 13818-1, Jun. 10, 1994) and a video encoding section (ISO/IEC 13818-2, Jan. 20, 1995). Commonly, the MPEG II standard defines a packetized data stream representing a data content including a plurality of channels. Meanwhile, encryption and scrambling used herein have substantially the same meaning. Similarly, decryption and unscrambling have substantially the same meaning.

The scrambler/descrambler and encryptor/decryptor may conform to various national standards. The scrambler and the descrambler may conform to for example a DVB scrambler of European Tele-communication Standard Institute (ETSI) and Data Encryption Standard (DES) in U.S., and a DVB scrambler of Association of Radio Industries and Businesses (ARIB) in Japan.

Generally, in the technical field relevant to the present invention, messages communicated between the head end and the subscriber may be classified into an entitlement control message (ECM) and an entitlement management message (EMM). The ECM is a message related to a scrambled program or information needed to decrypt the scrambled program (for example, source code stream), and the EMM is a message related to information needed to determine whether a user is an individual subscriber or a subscriber permitted to view a program. For example, in an exemplary embodiment of the present invention, as illustrated in FIG. 3, since the control word CW is used to unscramble the source code stream, an encrypted message E(CW) is an ECM message. The remaining other messages, that is, the encrypted update key E(BK) and the encrypted channel encryption key E(CEK) are EMM messages. The ECM message and EMM message may be separately distributed or may be packaged together and distributed. For convenience of illustration, the keys used to encrypt the EMM message are collectively called as an entitlement management key (EMK), such as MPK, PK, BEK, SUK, CPK and CEK.

The channel encryption key CEK will be described. The channel encryption key CEK is one of channel management keys (CMKs) and is used to encrypt a control word for encryption of a content. The channel encryption key CEK may be periodically updated. For example, the channel encryption key may be updated by the following methods:

First, the channel encryption key CEK is generated and managed corresponding to a service channel in one-to-one correspondence. In this case, all channel encryption keys are updated in a certain time.

Second, a set of channel encryption keys (CEKs) is formed and sequentially used. In this case, the keys are used during a certain time and then sequentially updated.

Before lifetime of the channel encryption key CEK expires, an updated channel encryption key CEKn should be delivered to a user. The updated channel encryption key CEKn may be encrypted with an updated update key BKn for delivery. The channel encryption key (CEK) generator CEK_G generates a random number corresponding to each channel, and the encryptor 301c encrypts the generated random number using the update key BK as an encryption key.

The channel packing key CPK will be described. The channel packing key CPK is one of channel management keys CMK and may be not used since it is optional. When service channels are to be grouped and managed according to their characteristics, the service channels are grouped according to their characteristics and managed by corresponding a channel packing key CPK to each group. Meanwhile, it is desirable that the channel packing key CPK is used when the first described structure of the channel encryption key CEK is used.

The channel packing key CPK and the channel encryption key CEK may be periodically updated. For example, the control word CW may be updated at 10-second intervals, the channel encryption key CEK at one-day intervals, the channel packing key CPK at fifteen-day intervals, and the update key BK at thirty-day intervals.

The user key UK of the subscriber 350 is, in advance, stored in the security device, which is distributed to the subscriber when he or she subscribes service. The decryptor 309a decrypts an encrypted update key $E_{UK}$(BK) with the user key UK. The decryptor 309b decrypts an encrypted channel encryption key $E_{BK}$(CEK) with the decrypted update key BK, and the decryptor 309c decrypts the encrypted control word $E_{CEK}$(CW) with the channel encryption key CEK and outputs the decrypted control word to the descrambler 311.

The descrambler 311 decrypts a scrambled code stream with the control word CW and outputs it to a decoder (not shown), and data decoded by the decoder is displayed by a television (TV).

Figure 1:
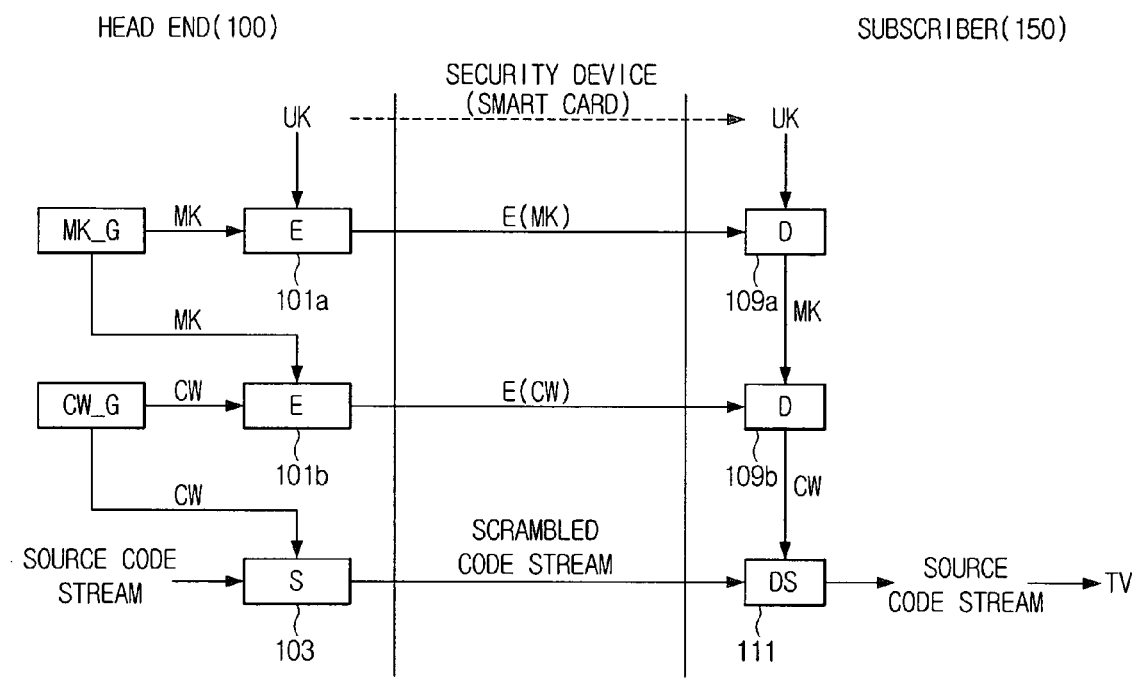
FIG. 1 illustrates an operation principle of a conventional conditional access system (CAS)
Figure 2:
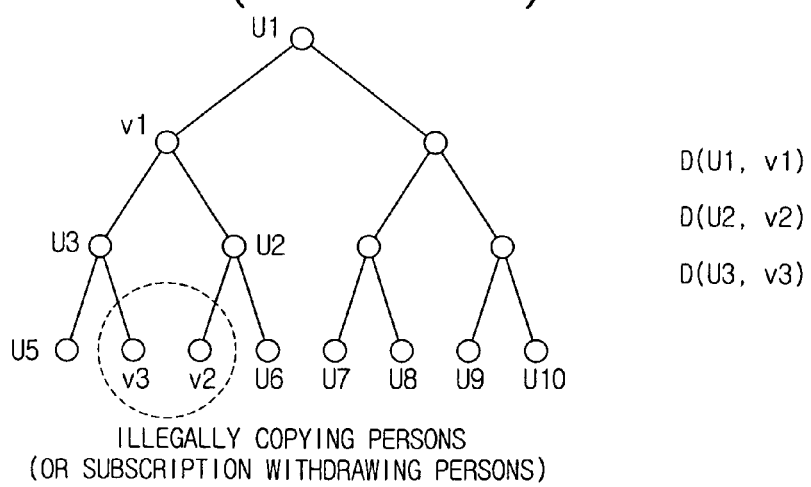
FIG. 2 illustrates a key distribution method in a conventional CAS.

According to an exemplary embodiment of the present invention, the CAS of FIG. 3 has an update key BK, unlike the conventional CAS of FIG. 1. The use of the update key BK enables illegal use to be controlled without laying a too heavy load on the CAS when broadcasting services on a plurality of channels are provided to a subscriber. In an exemplary implementation, the use of a subset user key SUK as a user key UK can significantly reduce a load on the CAS.

In an exemplary embodiment, each broadcasting channel is assigned an individual control word CW and a channel encryption key CEK, and the subset user key SUK is used as the user key UK, so that illegal use is controlled when broadcasting services on a plurality of channel are provided to a subscriber.

The registration of the security device 309 is performed by the CAS in a very safe environment. The CAS assigns a master private key MPK, a broadcast user key BEK or a subset user key SUK to the security device and registers a serial number of the security device thereto.

Figure 4:
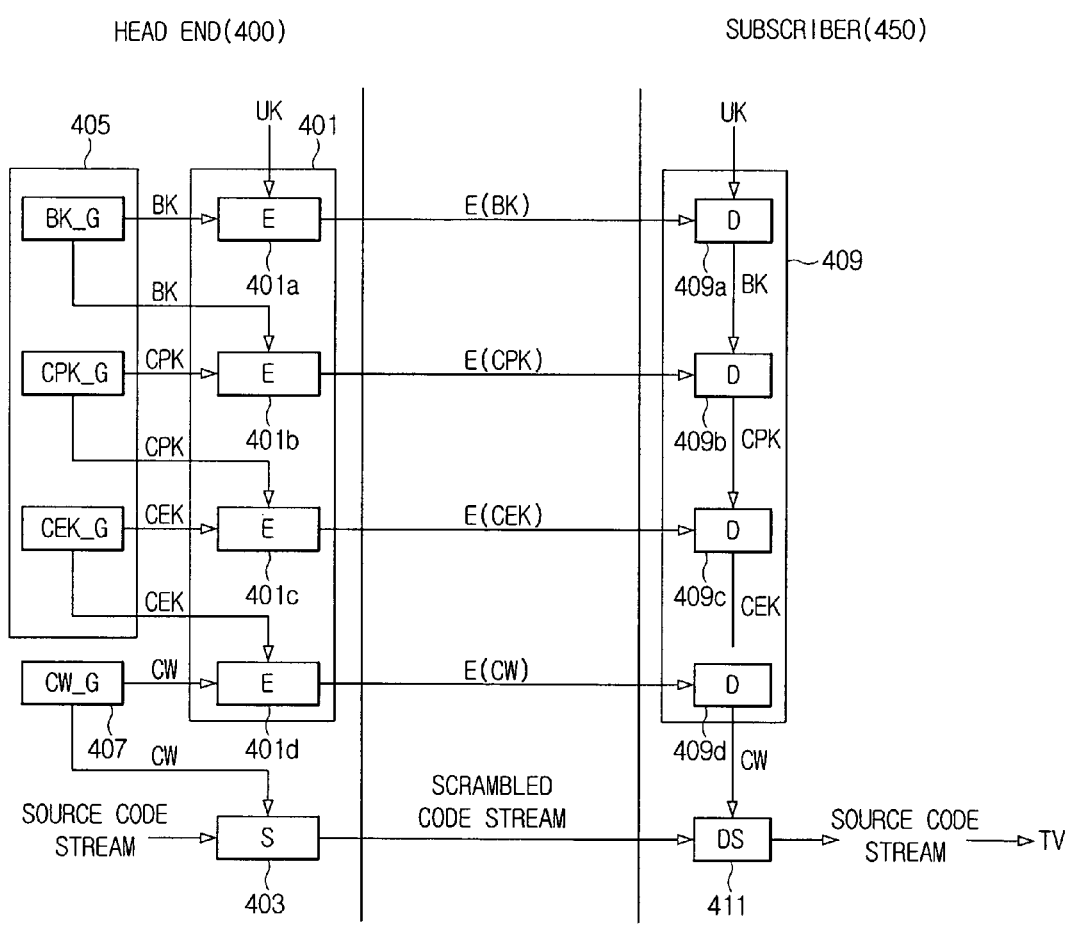
FIG. 4 illustrates an operation principle of a CAS according to another exemplary embodiment of the present invention.

FIG. 4 illustrates an operation principle of a CAS according to another exemplary embodiment of the present invention.

Since the CAS of FIG. 4 is generally similar to that of FIG. 3, only the differences therebetween will be described.

The CAS of FIG. 4 uses a channel packing key CPK and a channel encryption key CEK. The CAS according of FIG. 4 comprises a head end 400, which includes a key encryptor 401 (comprising encryptors 501a-501d), a key generator 405, a control word generator 407 and a scrambler 403. A subscriber 450 includes a decryptor 409 (comprising decryptors 409a-409d) and a descrambler 411. In an exemplary embodiment, the channel encryption key CEK is used to encrypt a control word CW, the channel packing key CPK is used to encrypt the channel encryption key CEK, and a update key BK is used to encrypt the channel packing key CPK. The encrypted channel packing key E(CPK) and the channel encryption key E(CEK) each are distributed to a subscriber 450 so that they are used to decrypt a control word used for a descrambler 411. This configuration enables service channels to be grouped and managed depending on their characteristics.

Figure 5:
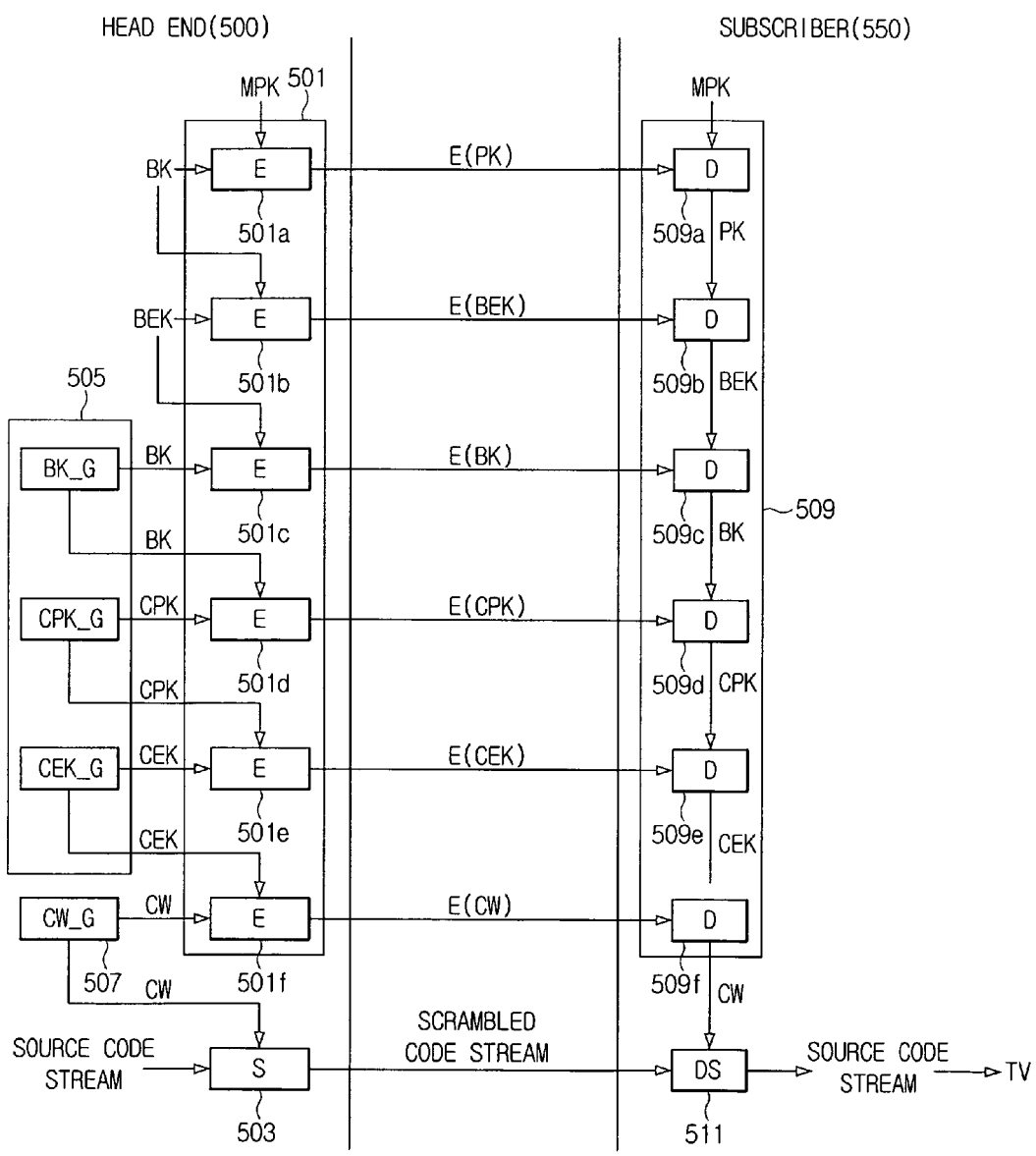
FIG. 5 illustrates an operation principle of a CAS according to yet another exemplary embodiment of the present invention.

FIG. 5 illustrates an operation principle of a CAS according to yet another exemplary embodiment of the present invention.

Since the CAS of FIG. 5 is generally similar to that of FIG. 4, only the differences therebetween will be described.

The CAS of FIG. 5 uses three user keys, which comprise a broadcast user key BEK, a private key PK, and a master private key MPK. The CAS according of FIG. 5 comprises a head end 500 which includes a key encryptor 501 (comprising encryptors 501a-501f), a key generator 505, a control word generator 507 and a scrambler 503. A subscriber 550 includes a decryptor 509 (comprising decryptors 509a-509f) and a descrambler 511. In an exemplary embodiment, the broadcast user key BEK is used to encrypt a update key BK, the private key PK is used to encrypt a broadcast user key BEK, and the master private key MPK is used to encrypt a private key PK. In this case, updated keys that are generated periodically (or upon a need) are encrypted with the private key PK and transmitted to subscribers that do not receive the updated keys. Further, updated entitlement information of the subscriber may be encrypted with the private key PK and transmitted. As such, the keys or the information encrypted with the private key PK are unicast to subscribers.

Figure 6:
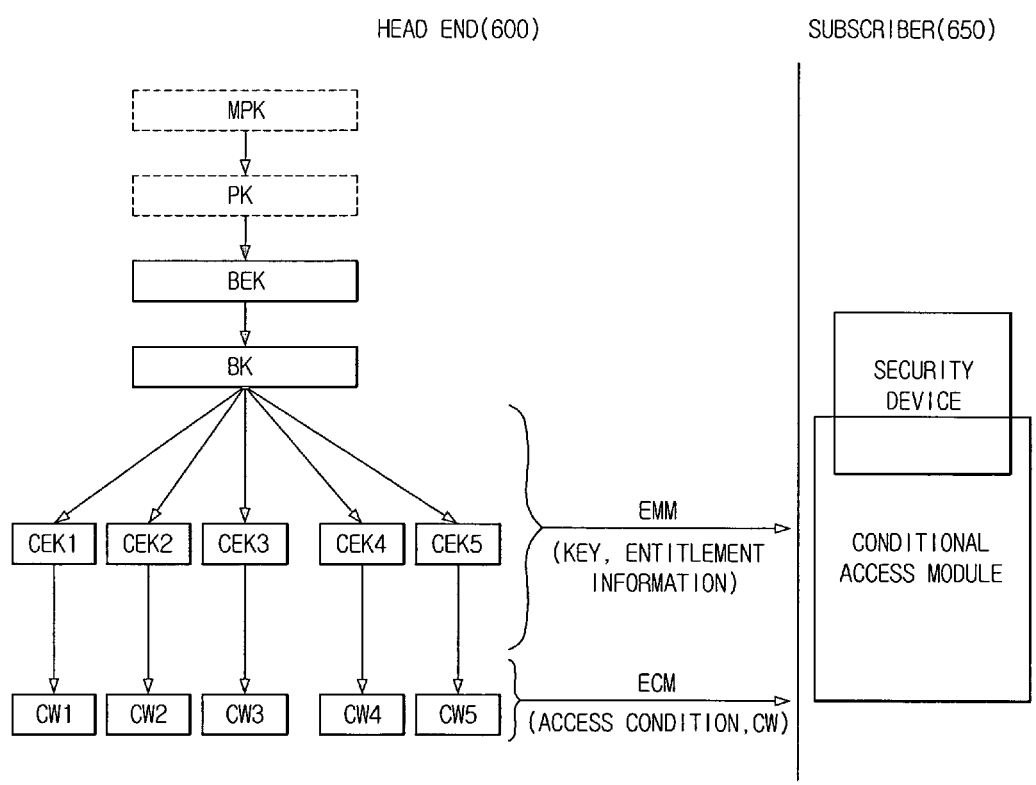
FIG. 6 illustrates a key hierarchical structure in a CAS according to an exemplary embodiment of the present invention.

FIG. 6 illustrates a key hierarchical structure in a CAS according to an exemplary embodiment of the present invention.

Referring to FIG. 6, CAS comprises a head end 600. A plurality of control words are encrypted with channel encryption keys CEK1, CEK2, ..., CEK5, respectively, and transmitted with access information to a subscriber 650. The respective channel encryption keys CEK1, CEK2, ..., CEK5 are encrypted with a update key BK and transmitted with entitlement information to a user. The update key BK is encrypted with a broadcast user key BEK and transmitted to the subscriber. Optionally, the update key BK may be encrypted with another user key, a private key PK, and transmitted. The private key PK may be encrypted with another user key, a master private key MPK, and transmitted. Alternatively, the broadcast user key BEK is encrypted with the master private key MPK and transmitted.

Referring to FIG. 6, an access control module (set top box) receives an EMM message and an ECM message, filters only messages corresponding to a user (using a user key), and delivers the messages to a security device. The security device decrypts the encrypted messages to deliver a control word to the access control module, and the access control module decrypts scrambled data with the control word to transmit the data to a display unit (not shown).

The security device and the access control module may be interconnected via any one communication interface of for example USB, USB 2, ISO 7816, 1394 and Bluetooth.

Figure 7:
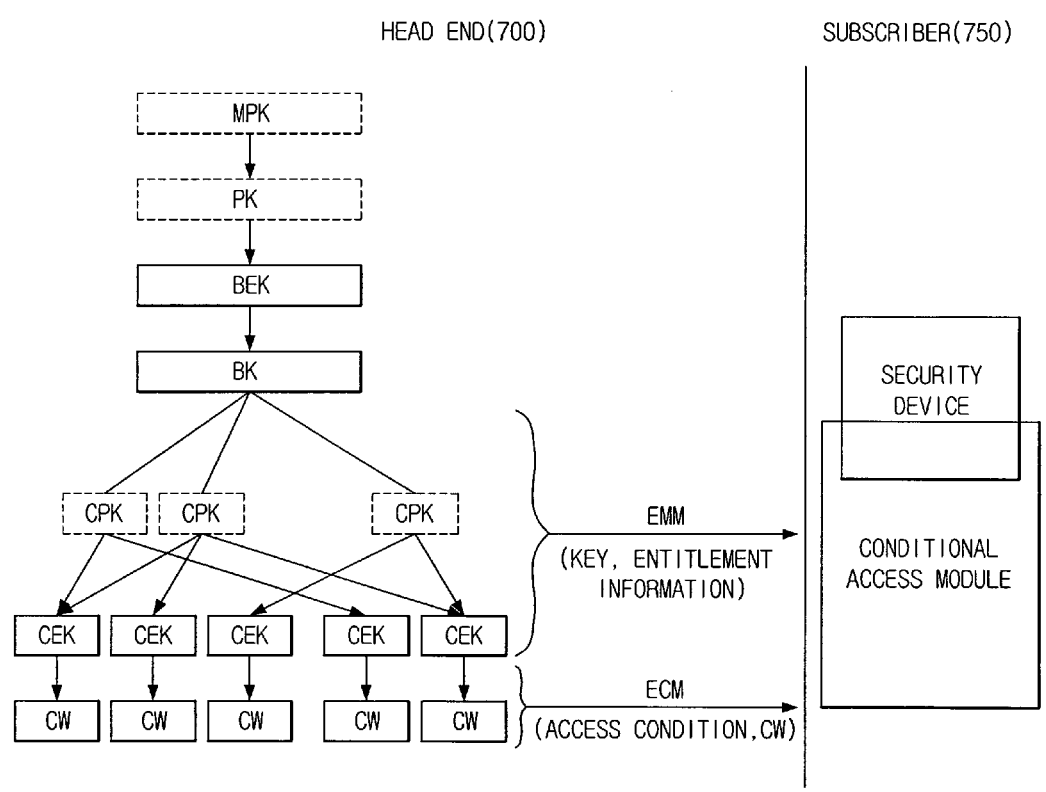
FIG. 7 illustrates a key hierarchical structure in a CAS according to another exemplary embodiment of the present invention.

FIG. 7 illustrates a key hierarchical structure in a CAS according to another exemplary embodiment of the present invention.

Only a difference between the key hierarchical structure of FIG. 7 and the key hierarchical structure of FIG. 6 will be described. The hierarchical structure of FIG. 7 further includes a channel packing key CPK, unlike the hierarchical structure of FIG. 6. Referring to FIG. 7, CAS comprises a head end 700. The channel packing key CPK is assigned for each group consisting of one or more channels. A left channel packing key CPK is used to encrypt a leftmost channel encryption key CEK and a second channel encryption key CEK from the right, and an intermediate channel packing key CPK is used to encrypt a leftmost channel encryption key CEK, a second channel encryption key CEK from the left, and a rightmost channel encryption key CEK. The channel packing keys CPKs are encrypted with the update key BK. A subscriber 750 is shown as an illustrative example.

Figure 8:
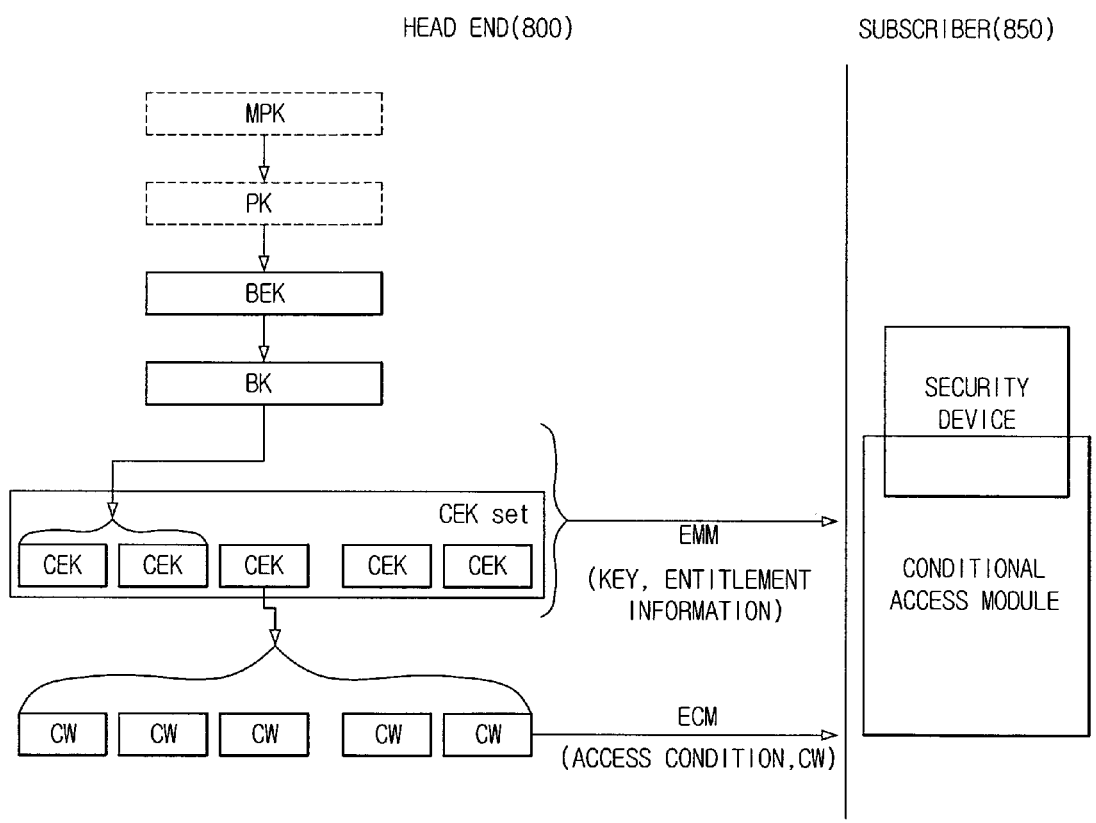
FIG. 8 illustrates a key hierarchical structure in a CAS according to yet another exemplary embodiment of the present invention.
Figure 9:
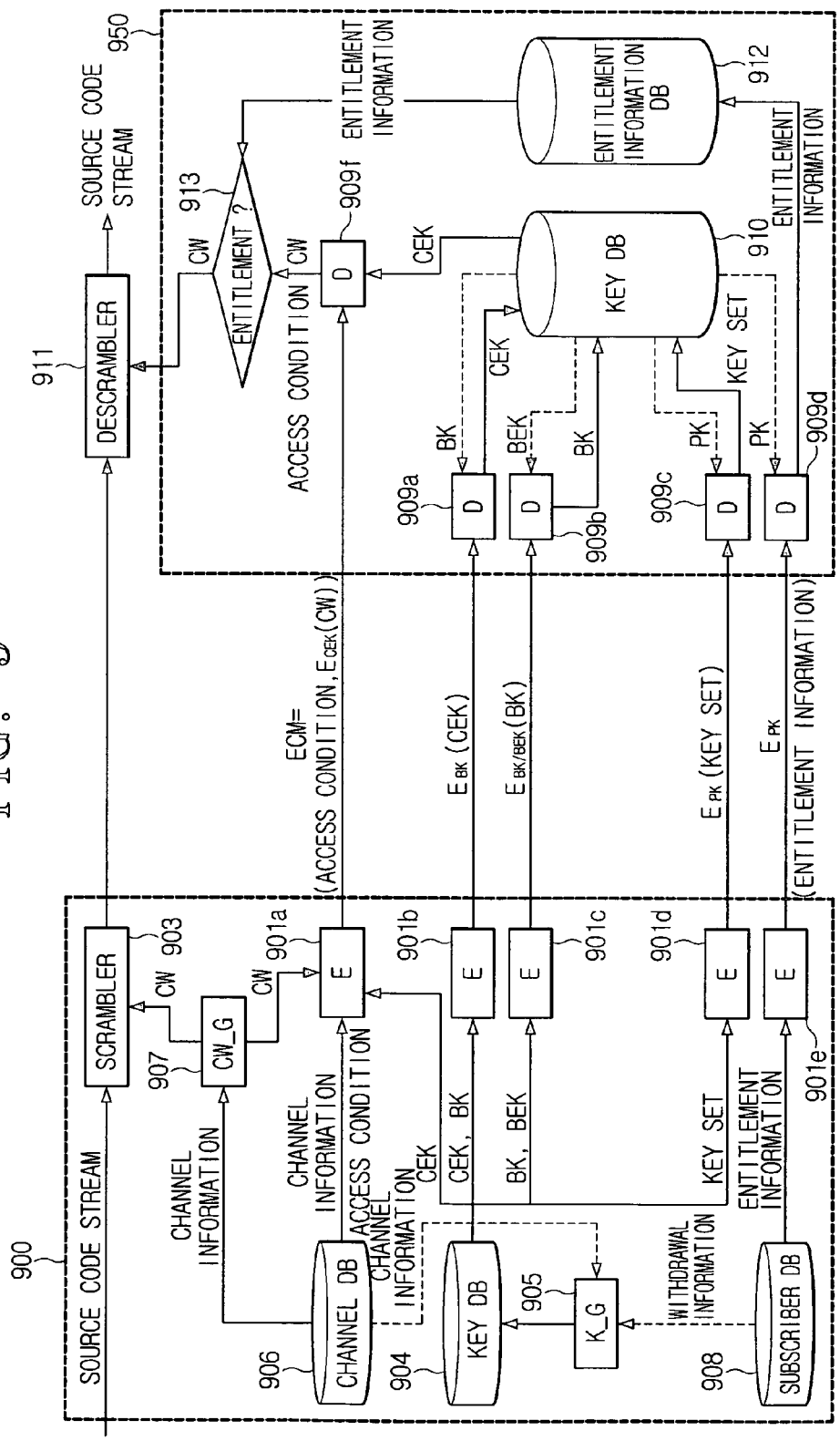
FIG. 9 is a functional block diagram of a CAS according to an exemplary embodiment of the present invention.

FIG. 8 illustrates a key hierarchical structure in a CAS according to yet another exemplary embodiment of the present invention. Only a difference between the key hierarchical structure of FIG. 8 and the key hierarchical structure of FIG. 7 will be described. Referring to FIG. 8, CAS comprises a head end 800. One channel encryption key CEK is sequentially assigned to a plurality of control words. In this case, channel encryption keys CEKs are, one-by-one extracted from a channel encryption key (CEK) set consisting of a plurality of channel encryption keys CEKs and used to encrypt a control word. A subscriber 850 is shown as an illustrative example FIG. 9 is a functional block diagram of a CAS according to an exemplary embodiment of the present invention.

According to an exemplary embodiment of the present invention, a CAS includes a head end 900, a security device 950, and a descrambler 911.

The head end 900 includes encryptors 901a, 901b, 901c, 901d and 901e, a scrambler 903, a key DB 904, a key generator K_G 905, a channel DB 906, a control word generator CW_G 907, and a subscriber DB 908.

The key generator 905 may generate a channel encryption key CEK and an update key BK. In an exemplary embodiment, the key generator 905 may generate the channel encryption key CEK corresponding to channel information. Further, the key generator 905 may generate a subset user key SUK considering cancellation information.

A key DB 904 stores an update key BK, a channel encryption key CEK, and user keys UKs such as MPK, PK, BEK and SUK.

The channel DB 906 stores channel information and an access condition. The channel information means information on service (for example, broadcasting program) itself. Examples of the channel information include a channel number, a program number, or a stream program ID (PID). The access condition indicates a condition for legally using provided service. Examples of the access condition include a channel number, a program number, paid/free, price, user age restriction, and region restriction.

The subscriber DB 908 stores entitlement information on subscriber entitlement. The subscriber entitlement information indicates viewing entitlement information that the subscriber requests to a service provider (for example, numbers of channels requested by the subscriber, a token purchased to use paid service, user's age, and a subscription region). For example, the subscriber entitlement information may be a subscriber-requested one information of PPV (Pay Per View), IPPV (Impulse Pay Per View), PPVP (Pay Per View Program), and PPVT (Pay Per View Time).

The control word generator 907 receives channel information, generates a control word corresponding to a channel, and outputs the control word to the scrambler 903 and the encryptor 901a.

The scrambler 903 scrambles an input source code stream with the received control word.

The encryptor 901a encrypts the channel information and the access condition, which are received from the channel DB 906, with the control word. In this embodiment, the control word is encrypted with the channel encryption key CEK, and the encrypted control word and the access condition are transmitted to the subscriber 960 in the form of the EMM message.

The encryptor 901b encrypts the channel encryption key CEK with the update key BK and outputs the encrypted channel encryption key CEK, and the encryptor 901c may encrypt the updated update key BKn with an old update key BK or broadcast user key BEK. Further, the encryptor 901d may encrypt a set of the update key BK, the channel encryption key CEK, and the control word CW. The head end 900 encrypts and transmits the updated key set to subscribers who do not receive updated update key, channel encryption key, channel encryption key, channel packing key, and/or control word.

The encryptor 901e may encrypt the entitlement information with the user key.

According to an embodiment of the present invention, the security device 950 may include a series of decryptors 909a, 909b, 909c, 909d and 909f, a key DB 910, an entitlement information DB 912, and a comparator 913.

The key DB Database 910 may store the user keys MPK, PK, BEK and SUK, an update key BK, a channel encryption key CEK, and a control word CW.

The encryptor 909a receives the update key BK from the key DB 910 to decrypt the encrypted channel encryption key E(CEK) and returns the channel encryption key CEK to the key DB 910.

The encryptor 909b receives the broadcast user key BEK from the key DB 910 to decrypt the encrypted update key E(BK) and returns the update key BK to the key DB 910. The encryptor 909c receives the private key PK from the key DB 910 to decrypt the encrypted key set and returns the key set to the key DB 910. The encryptor 909d receives the private key PK from the key DB 910 to decrypt the encrypted entitlement information and transmits the entitlement information to the entitlement information DB 912.

The entitlement information DB 912 stores the decrypted entitlement information. Preferably, the entitlement information DB 912 stores the most recent entitlement information.

The encryptor 909f receives the channel encryption key CEK from the key DB 910 to decrypt the encrypted ECM message containing the control word. The encryptor 909f sends the decrypted control word and the access condition to the comparator 913.

The comparator 913 compares the access condition to the entitlement information from the entitlement information DB. Further, the comparator 913 receives the control word CW from the decryptor and outputs it to a descrambler connected to the comparator. The comparator 913 controls the output of the control word CW to the descrambler according to a comparison result between the access condition and the entitlement information. The comparator 913 compares the service access condition to the user's entitlement information and outputs the control word CW to the descrambler only if the user's entitlement condition is sufficient for use of the service. For example, let's assume that the access condition indicates that access is allowed only to an adult who is 20 years old or older and the entitlement information indicates that the subscriber is 17 years old. In this case, since the two conditions do not match, the comparator 913 does not output the control word.

In an exemplary embodiment, after the control word is first decrypted regardless of the comparison result between the entitlement information and the access condition, the control word is output to the descrambler 911 depending on the comparison result. In an alternate example, the entitlement information is compared to the access condition before the control word is decrypted, it is determined whether the encrypted control word is decrypted based on the comparison result, and then the encrypted control word is decrypted only if the both match.

Meanwhile, while the comparator 913 is included in the embodiment of FIG. 9, the exemplary objects of the exemplary embodiments of the present invention can be achieved without the use of the comparator 913. That is, the decrypted control word CW may be output to the descrambler 1011 without a comparison between the access condition and the entitlement information.

Referring to FIG. 9, while messages are shown as being separately distributed between the head end 900 and the security device 950, they may be mixed by a multiplexer and distributed together.

Signals and an interface of the security device are described in the International standard organization document ISO 7816-3 (1989), the disclosure of which is hereby incorporated by reference in its entirety. Further, an encryption algorithm for the security device is described in U.S. Pat. No. 6,016,348, entitled "DECODING SYSTEM AND DATA FORMAT FOR PROCESSING AND STORING ENCRYPTED BROADCAST, CABLE OR SATELLITE VIDEO DAT" Jan. 18, 2000, the disclosure of which is hereby incorporated by reference in its entirety.

Figure 10:
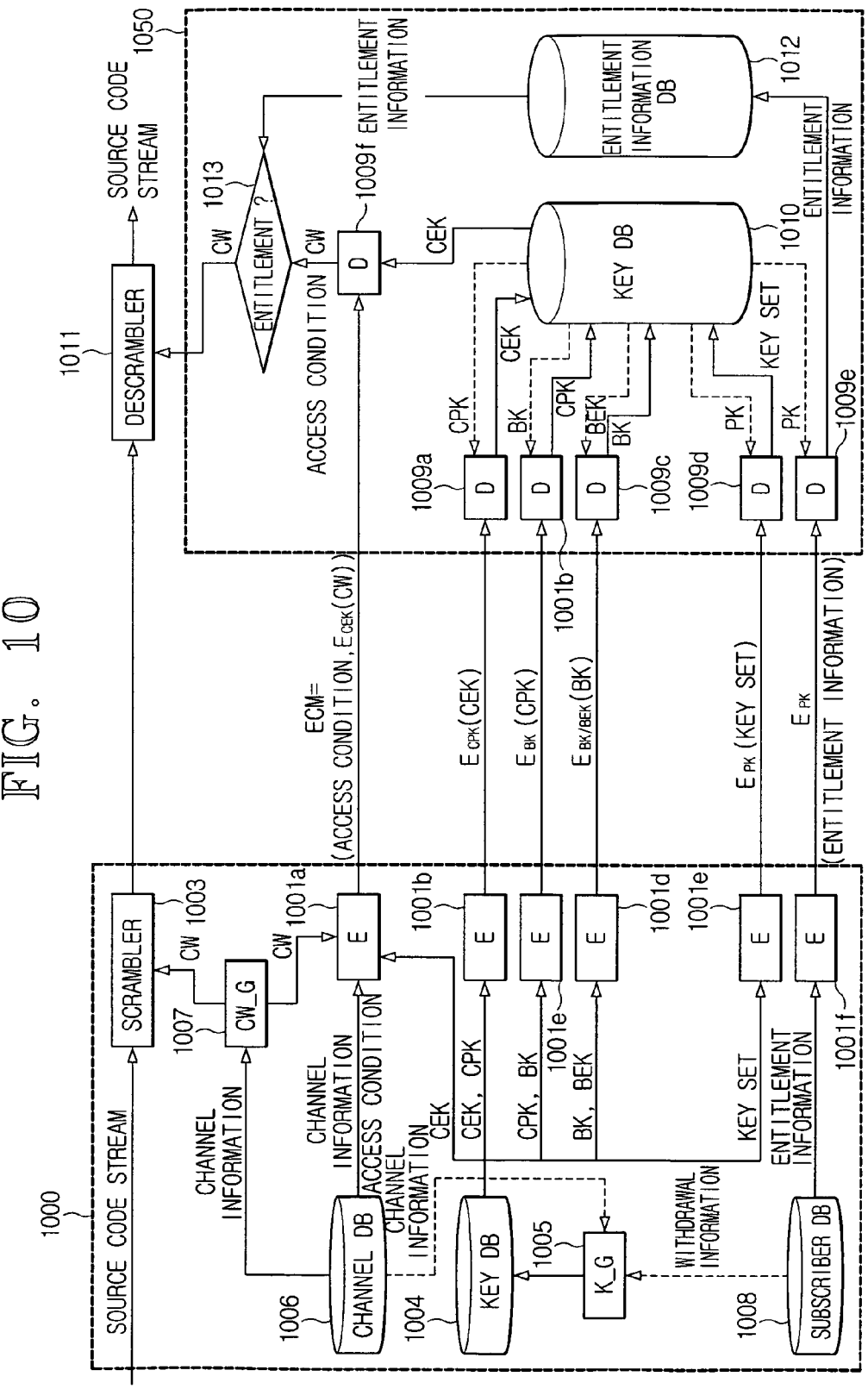
FIG. 10 is a functional block diagram of a CAS according to another exemplary embodiment of the present invention.

FIG. 10 is a functional block diagram of a CAS according to another embodiment of the present invention. CAS of FIG. 10 includes a head end 1000, a security device 1050, and a descrambler 1011. The head end 1000 includes encryptors 1001a, 1001b, 1001c, 1001d, 1001e and 1001f, a scrambler 1003, a key DB 1004, a key generator K_G 1005, a channel DB 1006, a control word generator CW_G 1007, and a subscriber DB 1008. The security device 1050 may include a series of decryptors 1009a, 1009b, 1009c, 1009d, 1009e and 1009f, a key DB 1010, an entitlement information DB 1012, and a comparator 1013.

Since the CAS of FIG. 10 is generally similar to that of FIG. 9, only a difference therebetween will be described.

Referring to FIG. 10, the key generator 1005 additionally generates a channel packing key CPK. The key generator 1005 may generate a channel encryption key CEK corresponding to each channel and generate a channel packing key CPK corresponding to a group consisting of a plurality of channels.

The encryptor 1001c encrypts the channel packing key CPK with the update key BK. The encryptor 100b encrypts the channel encryption key CEK with the channel packing key CPK.

In the security device 1050, the encryptor 1001b decrypts the encrypted channel packing key E(CPK) with the update key BK and returns it to the key DB 1010. The encryptor 1009a decrypts the encrypted channel encryption key E(CEK) with the decrypted channel packing key CPK and returns it to the key DB 1090.

This configuration enables a plurality of channels to be grouped and managed depending on their characteristics. For example, only adult channels or paid channels among channels may be separately managed.

Figure 11:
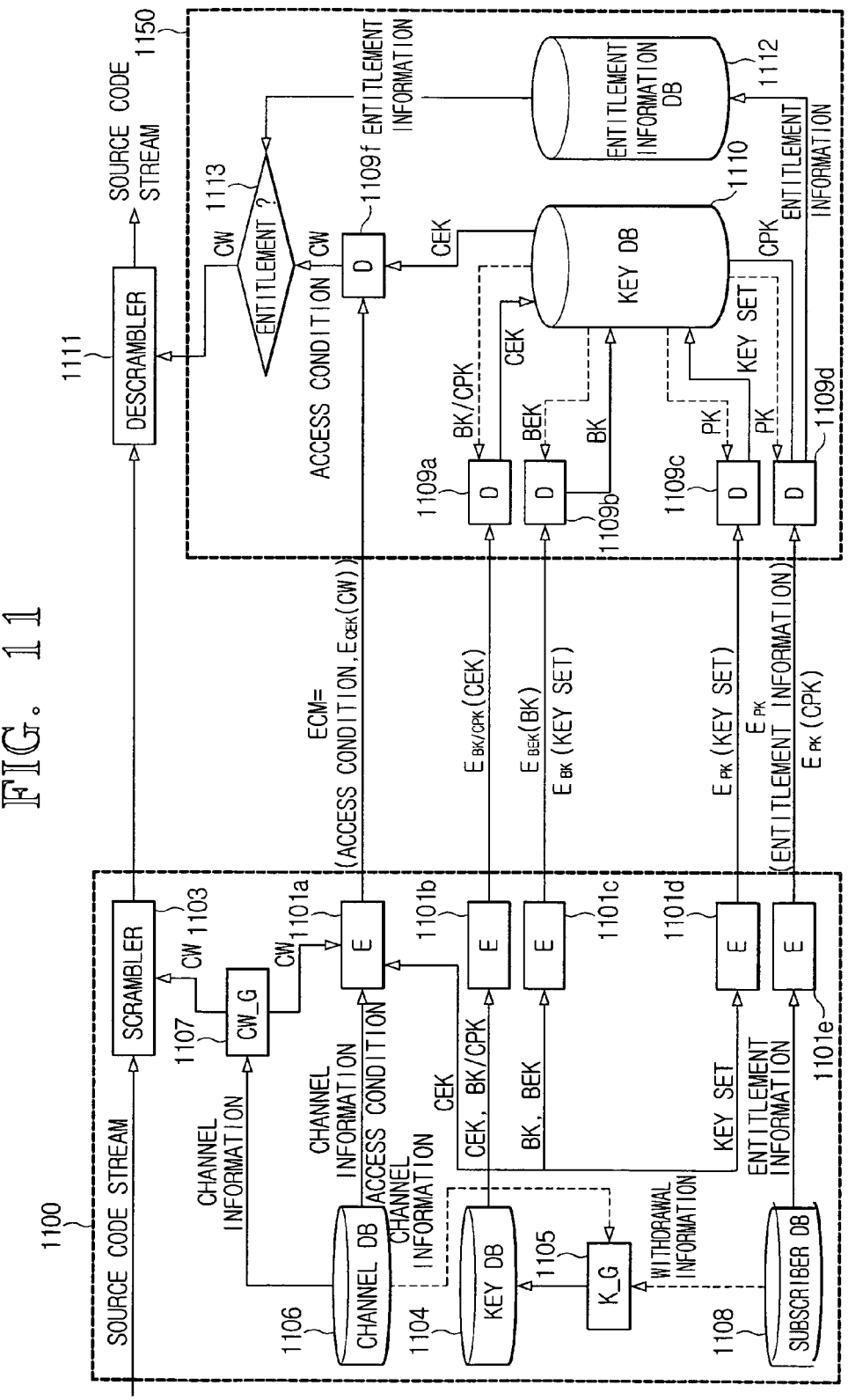
FIG. 11 is a functional block diagram of a CAS according to yet another exemplary embodiment of the present invention.

FIG. 11 is a functional block diagram of a CAS according to yet another exemplary embodiment of the present invention. CAS of FIG. 11 includes a head end 1100, a security device 1150, and a descrambler 1111. The head end 1100 includes encryptors 1001a, 1101b, 1101c, 1101d and 1101e, a scrambler 1103, a key DB 1104, a key generator K_G 1105, a channel DB 1106, a control word generator CW_G 1107, and a subscriber DB 1108. The security device 1050 may include a series of decryptors 1109a, 1109b, 1109c, 1109d and 1109f, a key DB 1110, an entitlement information DB 1112, and a comparator 1113.

Since the CAS of FIG. 11 is generally similar to that of FIG. 9, only a difference therebetween will be described. Referring to FIG. 11, the key generator 1105 generates a channel packing key CPK and a channel encryption key CEK. In this embodiment of FIG. 11, an encryptor for separately encrypting the channel packing key CPK is not provided, unlike the embodiment of FIG. 10.

A method of encrypting a channel packing key CPK or other keys will be described.

The encryptor 1101b encrypts the channel encryption key CEK with the channel packing key CPK (or the update key BK), and the encryptor 1101e encrypts the channel packing key CPK with the private key PK.

In the security device 1150, the decryptor 1109d decrypts the encrypted channel packing key CPK with the private key PK and returns it to the key DB 1110.

If the decryptor 1109a decrypts the encrypted channel packing key CPK with the private key PK and returns it to the key DB 1110, the channel encryption key CEK may be used by the decryptor 1109f.

Figure 12:
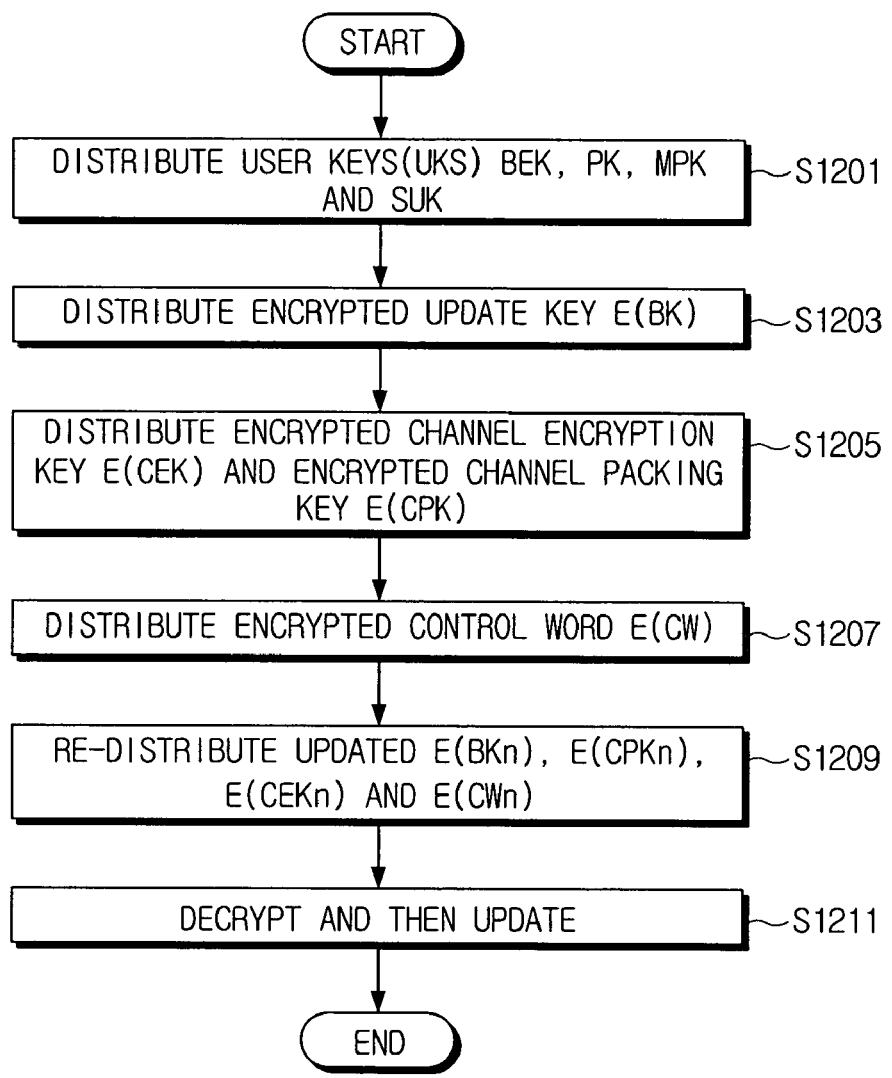
FIG. 12 is a flow diagram illustrating a method of a CAS according to an exemplary embodiment of the present invention.

FIG. 12 is a flow diagram illustrating a method of a CAS according to an exemplary embodiment of the present invention.

When a security device is registered in a CAS, the CAS distributes user keys BEK, PK, MPK and SUK to the security device (S1201). The distributed user keys are stored in the key DBs 910, 1010 and 1110 (see FIGS. 9, 10 and 11, respectively) of the security device.

The CASs 900, 1000 and 1110 distribute the update key E(BK), encrypted with the user key, to a subscriber (S1203). It also distributes an encrypted channel packing key E(CPK), an encrypted channel encryption key E(CEK), and an encrypted control word E(CW) (S 1205, S1207). The thus distributed keys may be stored in the key DBs 910, 1010 and 1110 of the security device.

The CASs 900, 1000 and 1110 need to update the keys periodically, upon a user's request, or when a card is illegally copied. To this end, the CASs 900, 1000 and 1110 newly re-distribute the updated update key BKn, channel packing key CPKn, channel encryption key CEKn and control word CWn to the subscriber (S1209). When a card is illegally copied, it is desirable that the update key BK is first updated. According to this method, a transmission amount of the EMM messages in the CASs 900, 1000 and 1110 does not increase even though the number of users increases.

Meanwhile, the subscriber decrypts encrypted keys with his or her user keys BEK, PK, MPK and SUK and stores the decrypted keys in the key DB (S1211).

Figure 13:
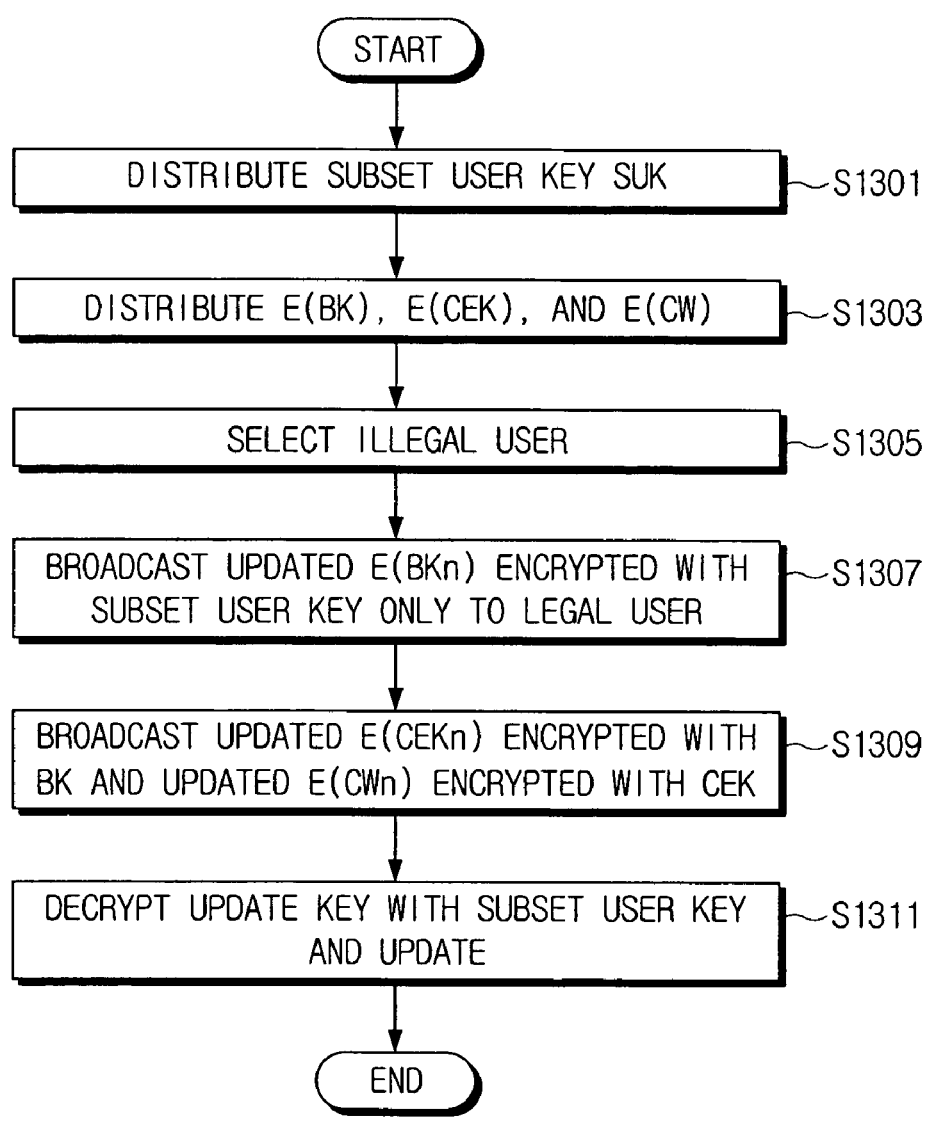
FIG. 13 is a flow diagram illustrating a method for controlling illegal use of a CAS according to an exemplary embodiment of the present invention.

FIG. 13 is a flow diagram illustrating a method for controlling illegal use of a CAS according to an exemplary embodiment of the present invention.

When a security device is registered in a CAS, the CAS assigns a subset user key SUK to the security device (S1301). The assigned subset user key SUK is stored in the key DBs 910, 1010 and 1110 (see FIGS. 9, 10 and 11, respectively) of the security device.

The subset user key SUK distributed by the CASs 900, 1000 and 1110 may be determined by the following method.

It is assumed that a set consisting of subscribers and illegal users of the CAS is a universal set U, and a set having legal users (subscribers) as elements, that is, a subset of the universal set U is S. The set S is decomposed into at least one subset. These subsets are assigned a subset user key (SUK). The number of possible subset user keys SUKs excluding a null set may be determined by the following equation.

$$\text{Number (\#) of subset user keys} = 2^t - 1, \qquad \text{Equation 1}$$

where, t indicates the number of legal users (subscribers).

Each security device (smart card) will have one, assigned to a subset to which the security device belongs, among the subset user keys SUKs as many as the number (#) determined by Equation 1.

The security device then distributes the update key BK, the channel encryption key CEK, and the control word CW to the subscriber (S1303).

The CASs 900, 1000 and 1110 periodically check whether there is an illegal user and select the illegal user (S1305). The selection is performed by a traitor tracing scheme. The traitor tracing scheme is described in U.S. Patent Laid-open Publication No. 2004/0111611, entitled "Method for tracing traitors and preventing piracy of digital content in a broadcast encryption system," Jun. 10, 2004, the disclosure of which is hereby incorporated by reference in its entirety. Further, see a technique document, Chor, B., Fiat, A. and Naor, M., "Tracing traitors," Proceedings of CRYPTO'94, 257-270, 1994, the disclosure of which is hereby incorporated by reference in it entirety. The traitor tracing schemes described in the patent disclosure and the technique document are only illustrative, and any technique may be used in the step S1303 if it has a capability of tracking illegal users.

If it is determined that there is an illegal user, a updated update key BKn encrypted with the subset user key SUK is broadcasted to the subscriber (S1307).

The number of the subset user keys SUK for encryption in the step S1307 may be determined by the following equation.

$$\text{Number (\#) of subset user keys} = 2r - 1, \qquad \text{Equation 2}$$

where, r indicates the number of illegal users.

For example, if three of hundred CAS users are illegal users, the CASs 900, 1000 and 1110 encrypt the updated update key with 2×3−1, i.e., 5 user keys and broadcast it to a subscriber. The five user keys are selected so that only legal users excluding the three illegally users receive the updated update key.

The CASs broadcast an updated channel encryption key CEKn encrypted with the updated update key BKn and an updated control word CWn encrypted with the updated channel encryption key CEKn to the subscriber (S 1309).

The subscriber decrypts the received updated encrypted update key E(BK)n with his or her subset user key SUK to obtain the updated update key BKn (S1311). The illegal users cannot decrypt the updated update key BKn. This is because the head end encrypts the update key with the subset user key SUK that the illegal users do not have and broadcasts the encrypted update key to the subscriber. The legal users obtaining the updated update key can decrypt the updated encrypted channel encryption key and the control word.

FIG. 14 illustrates a comparison in performance between an exemplary embodiment of the present invention and a prior art.

In FIG. 14, there is shown a comparison between an exemplary embodiment of the present invention using the channel encryption key CEK and the key distribution scheme disclosed in US 2004/0120529 "IBM", in the number of EMM messages to be transmitted from the head end to the subscriber if there are ten million subscribers and hundred service channels, and ten illegally copied cards.

The number of messages to be transmitted to the subscriber will be described beginning with the present invention.

In the case of the exemplary embodiments of the present invention, both an update key BK and a channel encryption key CEK should be transmitted to the subscriber. It is necessary to encrypt and transmit the update key BK with the subset user key SUK prior to transmission of the channel encryption key CEK. The number of the subset user keys SUK for encrypting the update key BK is selected to include remaining users excluding the illegal users. The number of the subset user keys SUKs is 2×10−1=19 according to Equation 2.

The head end broadcasts the update key encrypted with the 19 user keys to the subscribers. In an exemplary implementation, the users having an excluded user key are illegal users who cannot have the updated update key.

If there is no illegally copied card, it suffices that the update key updated with one subset user key SUK is broadcasted to the subscribers.

Since the channel encryption key CEK is differently set for each channel, one channel encryption key CEK per channel may be broadcasted to the subscriber.

Accordingly, according to exemplary embodiments of the present invention, if there are ten illegally copied cards, a total of 119 EMM messages are needed, and if there is no illegally copied card, a total of 101 EMM messages are needed.

The number of messages to be transmitted to the subscriber according to the IBM technique will be now described.

First, it is assumed that each channel has a 100% viewing rate.

According to the IBM technique, if there is no illegal copied card and a different control word CW is assigned to each channel, hundred media keys MKs corresponding to the channel encryption key CEK are encrypted with user keys and transmitted to the subscribers. As such, if there is no illegal copied card, the IBM technique has the number of EMM messages less than that of the present invention by one.

If there is an illegal copied card, nineteen MKs encrypted using the subset user key SUK as an encryption key are needed for one channel. Since the number of the channels is 100, 1900 MK messages are needed. If there is an illegally copied card and services on a plurality of channels are provided, the IBM technique needs much more EMM messages, compared to exemplary embodiments of the present invention.

The IBM technique in which there is an illegal copied card and each channel has a 90% viewing rate will be described.

Since each channel includes 10% (million) illegal users, (2×1000000−1) MK messages per each channel are needed. Accordingly, 100×(2×1000000−1) MK messages are needed for the hundred channels.

If each channel has only a 90% viewing rate and there are ten illegal copied smart cards, (2×(1000000+10)−1) MK messages per each channel are needed.

Similarly, if there is no illegally copied card and each channel has only a 99 percentage rate, (2×100000−1) MK messages per each channel are needed according to the IBM technique.

As such, according to the IBM technique, as the number of the channels increases and a viewing rate of each channel is low, the number of the EMM messages to be transmitted from the head end to the subscriber increases.

An example of an implementation of the present invention in which there is no illegally copied card and each channel has only a 90 percentage viewing rate is described below.

In this case, 2×(1000000−1) update keys BK are transmitted to the subscribers according to Equation 2. Since a channel has a channel encryption key CEK, hundred update keys are transmitted to the subscribers. Accordingly, a total of [2×(1000000−1)]+100 EMM messages should be transmitted to the subscribers. It can be seen from the comparison with the IBM that the number of the to-be-transmitted EMM messages is significantly reduced.

If it is assumed that the number of all viewers is N, the average number of viewers per channel is n, the number of illegally copied smart cards is r, and the number of channels is m, the total number of channel encryption keys CEK and update keys BK to be transmitted to the subscribers according to an exemplary embodiment of the present invention may be determined by the following equation.

$$\text{Number of } EMM \text{ messages} = [2 \times \{(N-n)-r\}-1] + m \qquad \text{Equation 3}$$

The total number of the MKs to be transmitted to the subscribers according to the IBM technique may be determined by the following equation.

$$\text{Number of } EMM \text{ messages} = [2 \times \{(N-n)-r\}-1] \times m \qquad \text{Equation 4}$$

It can be seen from a comparison between the two equations that as the number of the channels increases, the exemplary implementations according to embodiments of the present invention transmit fewer EMM messages.

As described above, with the conditional access system CAS according to exemplary embodiments of the present invention, it is possible to reduce the burden due to the to-be-transmitted EMM messages, thus allowing the head end to more efficiently utilize communication resources.

Further, according to exemplary embodiments of the present invention, the security device and the head end can have a reduced number of the to-be-transmitted EMM messages when the security device is illegally copied or service subscription is withdrawn.

Meanwhile, according to exemplary embodiments of the present invention, the conditional access system CAS is able to control illegal use of the CAS while reducing the burden due to the to-be-transmitted EMM messages.

Exemplary embodiments of the present invention are applicable to many developed broadcast encryption schemes (BESs) without depending on the BESs.

The foregoing embodiment and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims and their equivalents, and many alternatives, modifications, and variations will be apparent to those skilled in the art.

What is claimed is:

1. A security apparatus of a conditional access system, the apparatus comprising:
   a key database for storing a user key assigned to a subscriber; and
   a decryptor for sequentially decrypting an update key encrypted with the user key, a service key encrypted with the update key, and a control word encrypted with the service key, and outputting a control word;
   wherein at least one of the update key, the service key and the control word are received from a head end of a conditional access system, and the user key is received from the key database;
   the update key is used for updating the service key and is updated in a predetermined sequence;
   the encrypted service key comprises a channel encryption key, and the encrypted control word is encrypted with the channel encryption key; and
   the channel encryption key is generated corresponding to a service channel in one-to-one correspondence and updated in a certain time, or is generated from a set of channel encryption keys used during a certain time and then sequentially updated.

2. The apparatus as claimed in claim 1, further comprising:
   an entitlement information database for storing updatable entitlement information on the subscriber; and
   a comparator for comparing an access condition received from the head end to the stored entitlement information;
   wherein the comparator receives the control word from the decryptor and outputs the control word to a descrambler connected to the comparator according to a comparison result between the access condition and the entitlement information.

3. The apparatus as claimed in claim 2, wherein
   the access condition comprises an indication of a condition for legally using service provided to the subscriber, and the entitlement information comprises an indication of information on entitlement of a subscriber requesting the service, and
   the comparator outputs the control word to the descrambler only if the entitlement information matches the access condition.

4. The apparatus as claimed in claim 1, wherein, if a first set comprises all subscribers and all illegal users of the conditional access system, and a second set comprises the all subscribers, the second set being a subset of the first set and being decomposed into at least one subset in which each of the decomposed subsets is assigned with a subset user key, the user key stored in the key database is one of the assigned subset user keys, assigned to the decomposed subsets to which a subscriber having the security device belongs.

5. The apparatus as claimed in claim 1, wherein the encrypted service key further comprises a channel packing key encrypted with the update key,
   wherein the channel encryption key is encrypted with the encrypted channel packing key, and the encrypted control word is encrypted with the encrypted channel encryption key.

6. The apparatus as claimed in claim 1, wherein
   the user key stored in the key database comprises a master private key and a broadcast user key,
   the decryptor further receives a broadcast user key encrypted with the master private key, and
   the encrypted update key received by the decryptor is an update key encrypted with the broadcast user key.

7. The apparatus as claimed in claim 1, wherein
   the stored user key in the key database comprises a master private key, a private key, and a broadcast user key,
   the decryptor further receives a private key encrypted with the master private key and a broadcast user key encrypted with the private key, and
   the encrypted update key received by the decryptor is an update key encrypted with the broadcast user key.

8. A head end apparatus of a conditional access system, the head end apparatus comprising:
   a key database for storing a user key assigned to a subscriber of a conditional access system;
   a generator for generating an update key, a services, and a control word;
   an encryptor for encrypting the update key with the user key, the service key with the update key, and the control word with the service key; and
   a transmitter for transmitting the encrypted update key, the encrypted service key, and the encrypted control word to the subscriber;
   wherein the update key is used for updating the service key and is updated in a predetermined case;
   the encrypted service key comprises a channel encryption key and the encrypted control word is encrypted with the channel encryption key; and
   the channel encryption key is generated corresponding to a service channel in one-to-one correspondence and updated in a certain time, or is generated from a set of channel encryption keys, used during a certain time and then sequentially updated.

9. The head end apparatus as claimed in claim 8, if a first set comprises at least one subscriber and at least one illegal user of the conditional access system, and a second set comprises the at least one subscriber, the second set being a subset of the first set, then, when the second set is decomposed into at least one subset and each of the subsets is assigned a subset user key, the user key is the assigned the subset user key.

10. The head end apparatus as claimed in claim 8, wherein
    the service key comprises a channel packing key,
    the encryptor, encrypting the service key with the update key, encrypts the channel packing key with the update key and the channel encryption key with the channel packing key, and
    the encryptor, encrypting the control word with the service key, encrypts the control word with the channel encryption key.

11. The head end apparatus as claimed in claim 8, wherein
    the user key comprises a master private key and a broadcast user key,
    the encryptor further encrypts the broadcast user key with the master private key, and
    the encryptor, encrypting the update key with the user key, encrypts the update key with the broadcast user key.

12. The head end apparatus as claimed in claim 8, wherein
    the user key comprises a master private key, a private key and a broadcast user key,
    the encryptor further encrypts the private key with the master private key and the broadcast user key with the private key, and the encryptor, encrypting the update key with the user key, encrypts the update key with the broadcast user key.

13. A control method of a conditional access system comprising a security apparatus and a head end apparatus, the method comprising:

by the head end apparatus, distributing an update key, a service key, and a control word to a subscriber of the conditional access system;

by the head end apparatus, encrypting an updated update key with a user key of the subscriber, an updated service key with the updated update key, and an updated control word with the updated service key;

by the head end apparatus, distributing the encrypted updated update key, the encrypted updated service key, and the encrypted updated control word to the subscriber; and by the security apparatus, sequentially decrypting the distributed encrypted updated update key, encrypted updated service key, and encrypted updated control word with the user key of the subscriber; and by the head end apparatus, updating the distributed update key, service key, and control word with the updated update key, updated service key, and updated control word wherein the update key is used for updating the service key and is updated in a predetermined case;

the encrypted service key comprises a channel encryption key and the encrypted control word is encrypted with the channel encryption key; and the channel encryption key is generated corresponding to a service channel in one-to-one correspondence and updated in a certain time, or is generated from a set of channel encryption keys used during a certain time and then sequentially updated.

14. The method as claimed in claim 13, wherein, if a first set comprises at least one subscriber and at least one illegal user of a conditional access system, and a second set comprises the at least one subscriber, the second set being a subset of the first set, then, when the second set is decomposed into at least one subset and each of the subsets is assigned a subset user key, the user key is one of the assigned subset user keys, assigned to the decomposed subsets to which the subscriber belongs.

* * * * *